United States Patent

Kohl et al.

Patent Number: 6,163,138
Date of Patent: Dec. 19, 2000

[54] DEVICE FOR SETTING THE OUTPUT VOLTAGE IN A THREE-PHASE ALTERNATOR

[75] Inventors: Walter Kohl, Lauffen; Wolfgang Jacob, Horb, both of Germany

[73] Assignee: Robert Bosch GmbH, Stuttgart, Germany

[21] Appl. No.: 09/308,470

[22] PCT Filed: Oct. 21, 1997

[86] PCT No.: PCT/DE97/02427

§ 371 Date: May 17, 1999

§ 102(e) Date: May 17, 1999

[87] PCT Pub. No.: WO98/25337

PCT Pub. Date: Jun. 11, 1998

[30] Foreign Application Priority Data

Dec. 2, 1996 [DE] Germany .......................... 196 49 790

[51] Int. Cl.[7] .................................................. H02P 9/14

[52] U.S. Cl. .............................................. 322/28; 322/25

[58] Field of Search ................................... 322/24, 25, 27, 322/28, 59

[56] References Cited

U.S. PATENT DOCUMENTS

| 4,379,990 | 4/1983 | Sievers et al. ............................ 322/99 |
| 4,542,462 | 9/1985 | Morishita et al. ....................... 364/424 |
| 4,584,515 | 4/1986 | Edwards ..................................... 322/28 |
| 4,602,205 | 7/1986 | Matsuhashi et al. ..................... 320/64 |
| 5,523,672 | 6/1996 | Schramm et al. ........................ 322/25 |
| 5,672,954 | 9/1997 | Watanabe .................................. 322/28 |
| 5,719,486 | 2/1998 | Taniguchi et al. ........................ 322/28 |
| 5,726,558 | 3/1998 | Umeda et al. ............................. 322/27 |
| 5,731,689 | 3/1998 | Sato ........................................ 322/25 |

FOREIGN PATENT DOCUMENTS

| 34 02 288 A1 | 4/1985 | Germany . |
| 195 32 297 | 8/1995 | Germany . |

*Primary Examiner*—Nicholas Ponomarenko
*Attorney, Agent, or Firm*—Michael J. Striker

[57] ABSTRACT

A device for controlling the output voltage of a rotary current generator is disclosed, in which a generator without exciter diodes is used, and the exciter current is furnished by the rectifier bridge of the generator. The exciter current is regulated with the aid of a first integrated circuit. In addition, a smart power high-side switch, which is regulated by an integrated circuit (IS2), is located in the exciter current circuit.

5 Claims, 2 Drawing Sheets

DEVICE FOR SETTING THE OUTPUT VOLTAGE IN A THREE-PHASE ALTERNATOR

PRIOR ART

The invention relates to a device for regulating the output voltage of a rotary current generator as generically defined by the preamble to the main claim.

In conventional power supply systems today in a motor vehicle, a rotary current generator is used whose exciter current is regulated with the aid of a voltage regulator in such a way that the output voltage of the generator maintains a predeterminable value. In a first type of circuitry, the exciter current is generated with the aid of exciter diodes. The exciter current flows through the exciter winding and the regulating transistor, which is influenced by a control portion of the voltage regulator. A power supply system of this kind in a motor vehicle is also known as a D+ system and is known for instance from German Published, Non-Examined Patent Application DE-OS 34 02 288.

In other power supply systems in motor vehicles, the exciter winding is connected to the generator output B+, at which the output voltage generated by the generator appears. In such a B+ system, regulating the exciter current is again done with the aid of a voltage regulator, which is then designed as a so-called multifunction regulator and includes a power transistor, which is triggered by the control portion of the voltage regulator as a function of the information supplied, in such a way that the output voltage occurring at the B+ terminal of the generator always has the desired value. A generator and voltage regulator system that includes a multifunction regulator and has no exciter diodes is known for instance from German Patent Application DE-P 19 532 297.5.

Advantages of the Invention

The device according to the invention for regulating the output voltage of a rotary current generator as defined by the characteristics of claim 1 has the advantage that even if a D+ regulator is used, the exciter diodes can be omitted. Thus a generator and voltage regulator system can be designed that takes conventional D+ regulators as its point of departure and is compatible with B+ voltage regulators that also are already available. The very low resting current takeup that can be attained is advantageous.

Another advantage is that subsequent damage protection in the event of system errors is obtained, so that the battery is for instance prevented from running dry in the event of uncontrolled full excitation. Another advantage is that emergency regulation can be performed, which intervenes in the event of uncontrolled full excitation and terminates this excitation. There is also high voltage strength even in the load dump situation. Another advantage is protection that occurs in the event of a field short circuit, or in other words an erroneous connection of the exciter winding to ground.

These advantage are attained by the device for regulating the output voltage of a rotary current generator having the characteristics of claim 1. In such a device, a conventional D+ regulator, which typically includes a monolith regulator IC, is connected to the B+ terminal of the generator via a so-called smart power high-side switch. This switch is preferably designed as an MOS transistor with an integrated periphery and represents a second integrated circuit. The exciter current flows to ground via the switch, the exciter winding and the regulating transistor. It is possible to influence the current through the exciter winding by means of both integrated circuit independently of one another, as a function of supplied information.

Further advantages of the invention can be attained with the refinements defined by the dependent claims.

DRAWING

One exemplary embodiment of the invention is shown in FIG. 1 of the drawing and will be explained in further detail below.

FIG. 2 shows a substitute circuit diagram for the regulator.

DESCRIPTION OF THE EXEMPLARY EMBODIMENT

Figure 1:
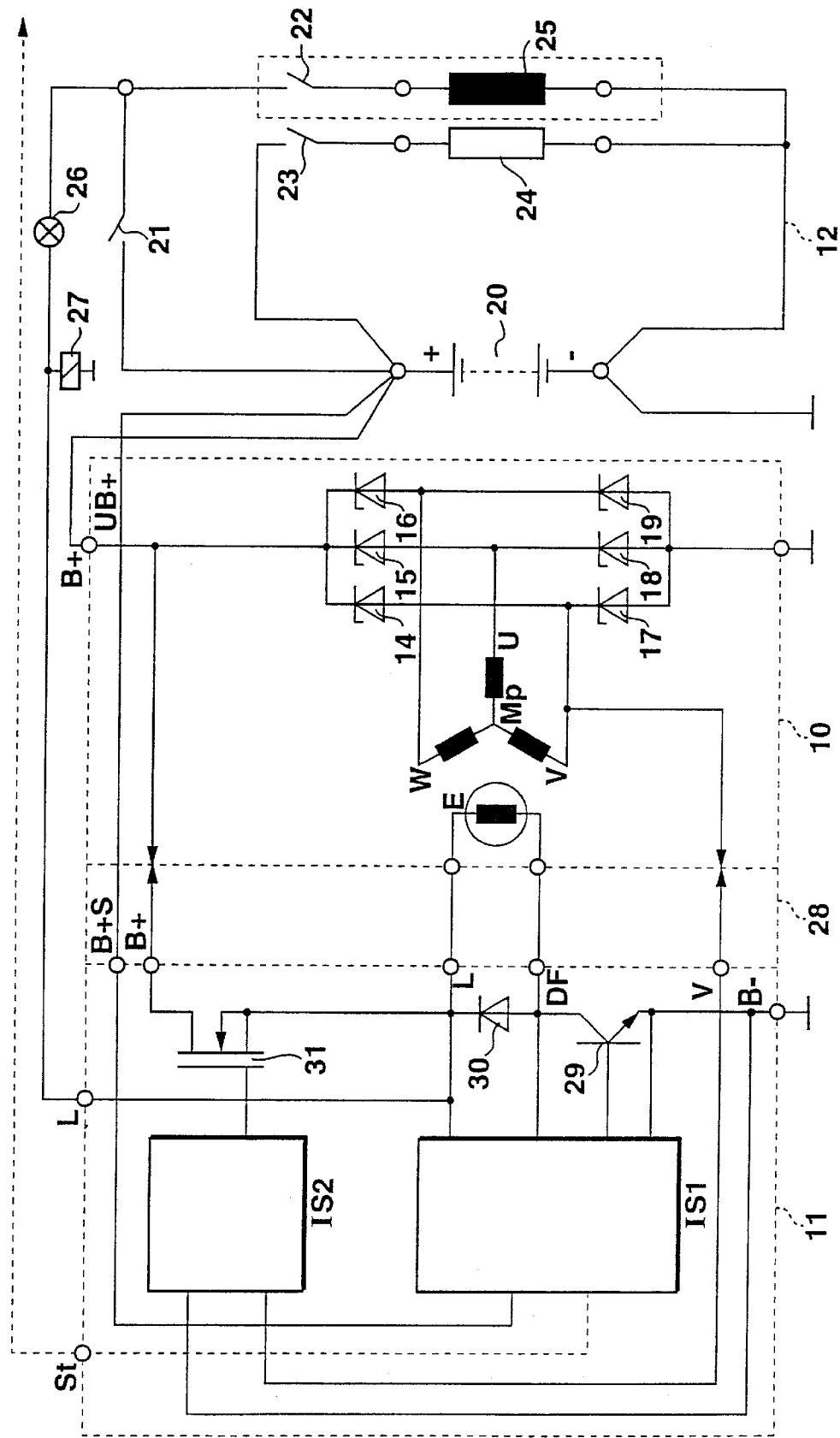

The rotary current generator 10 shown in FIG. 1 is intended for operation in motor vehicles and cooperates with the regulator 11. The output voltage of the rotary current generator 10 is designed UB+ and is tapped at the terminal B+ and serves to supply the vehicle electrical system 12.

In the usual way, the rotary current generator 10 includes three stator windings U, V, W, which are connected to a common center point Mp. The windings U, V, W are connected to a rectifier bridge 13, which includes six Zener diodes 14, 15, 16, 17, 18, 19 and is located between ground and the terminal B+. As a further component of the rotary current generator 10, the exciter winding E is shown, which is connected to the regulator 11. The electrical system 12 of the vehicle includes at least one battery 20, whose positive pole is connected to the terminal B+ of the rotary current generator 13 while the negative terminal is connected to ground. The battery 20 can be connected via switches 21, 22, 23 to the consumers of the vehicle electrical system 12; only one consumer 24 and the starter 25 are shown. The battery charge monitoring light 26 and the relay 27 also present; the charge monitoring light 26 is connected to the switches 21 and 22, and the relay 27 leads to the terminal L of the regulator 11.

The regulator 11, which via the brush holder 28 and four terminals B+, L, DF and V is connected to the rotary current generator 10, includes two integrated circuits IS1 and IS2 and one power transistor 29, one diode 30, and one field effect transistor 31. This field effect transistor 31 is wired as a switch. It is located between the terminal B+ of the brush holder 28 and the terminal L, which leads to the exciter winding of the rotary current generator. The triggering of the field effect transistor 31 is effected by the integrated circuit IS2. The regulating transistor 29 is connected by its collector in the usual way, via the terminal DF, to the exciter winding E of the rotary current generator 10. The emitter of the regulating transistor 29 is connected to ground, via the terminal B−. The triggering of the regulating transistor 29 is performed by the integrated circuit IS1. To that end, the integrated circuit IS1 is supplied with the variables relevant for the regulation, such as information on the exciter current via the terminal DF, information on the output voltage of the rotary current generator via the terminal B+S of the brush holder 28, and other information on the status of the charge monitoring light via the terminal L. The diode 30, finally, is located between the terminals L and DF; it is intended to prevent a direct current circuit from the field effect transistor 31 to the regulating transistor 29. In the exemplary embodiment shown in FIG. 1, the regulator 11 accordingly comprises a D+ regulator in a modern version, preferably a monolith regulator IC, which is designated IS1. The integrated circuit IS1 can be connected to the terminal B+ of the generator via a smart power high-side switch, preferably an MOS transistor with an integrated periphery (PPS). The integrated periphery to the field effect transistor 31 is designated as the integrated circuit IS2.

With regard to the regulating voltage, the integrated circuit IS1 is adapted such that between the terminal B+ of the generator and the actual value detection in the regulated mode, a voltage drops across the integrated circuit IS2; this voltage is kept low by the choice of a sufficiently low conducting resistance. The dimensioning can for instance be such that the resistance in the "ON" state RDSON is equal to 40 mΩ. The voltage drop UDS is then less than 220 mV at a current of 5.5 A.

The integrated circuit IS2 is primarily controlled via the voltage UV; an evaluation of the voltage UB+ is also done for the sake of detecting overly high and overly low voltage. The current IDS is also evaluated for short circuit detection, and optionally the voltage UL is also evaluated in order to detect whether the ignition switch 21 is closed. At low light power, that is, if the charge monitoring light 26 is for instance designed as an LED, then the preexciter current is additionally elevated. When information on an overly high temperature is supplied, an excess temperature shutoff can be tripped.

When the ignition switch is open, the voltage UV is approximately zero. The integrated circuit IS2 is then turned off. The resting current taken up is less than 100 μA. To compensate for any possibly blocking currents of the main current diodes 14–19 of the rectifier bridge 13 of the rotary current generator 10, a line leading away to ground is provided.

When the ignition switch is closed and the engine is at a stop, the preexcitation occurs, that is, the delivery of the exciter current to the exciter winding via the charge monitoring light 26. The integrated circuit IS2 is turned off, and the conditions are then equivalent to those in a conventional D+ regulator system. To establish a defined preexciter current, an active partial turn-on of the integrated circuit IS2 is additionally possible.

If the engine is to be started, the integrated circuit IS2 turns on as soon as the voltage UV exceeds an internally set threshold. The evaluation is then done, for instance with the aid of peak value rectification. Alternatively, or in addition, rpm or frequency evaluation and an attendant turn-on of the integrated circuit IS2 is possible. If the engine is to be switched off, then the integrated circuit IS2 switches off.

The detection of whether the ignition switch is on or off can also be done via an additional connection to terminal KL.15. An immediate shutoff of the integrated circuit IS2 then occurs as soon as it is noted that the ignition has been turned off.

Given a suitable design of the integrated circuit IS1, battery parameters can be ascertained and fed in, examples being the battery temperature or the battery voltage or the battery charge status. Other additional functions can also be realized. In the normal regulating mode, the integrated circuit IS2 switches not only the integrated circuit IS1 but also a relay 27 or the switch 23 to the terminal B+, so that other consumers can be turned on.

With the device for voltage regulation shown in FIG. 1, a number of error situations can be recognized and precautions can be taken if an error occurs. In detail, effects can be avoided in the event of the following errors:

1. Misapolarization of the battery 20

In the event of mispolarization of the battery 20, that is, if the terminals are transposed in connection to the positive and negative poles of the battery, the generator and the voltage regulator are protected by the main current diodes or Zener diodes. A current limitation is effected by the resistance of the relay.

2. Load shutoff

Figure 2:
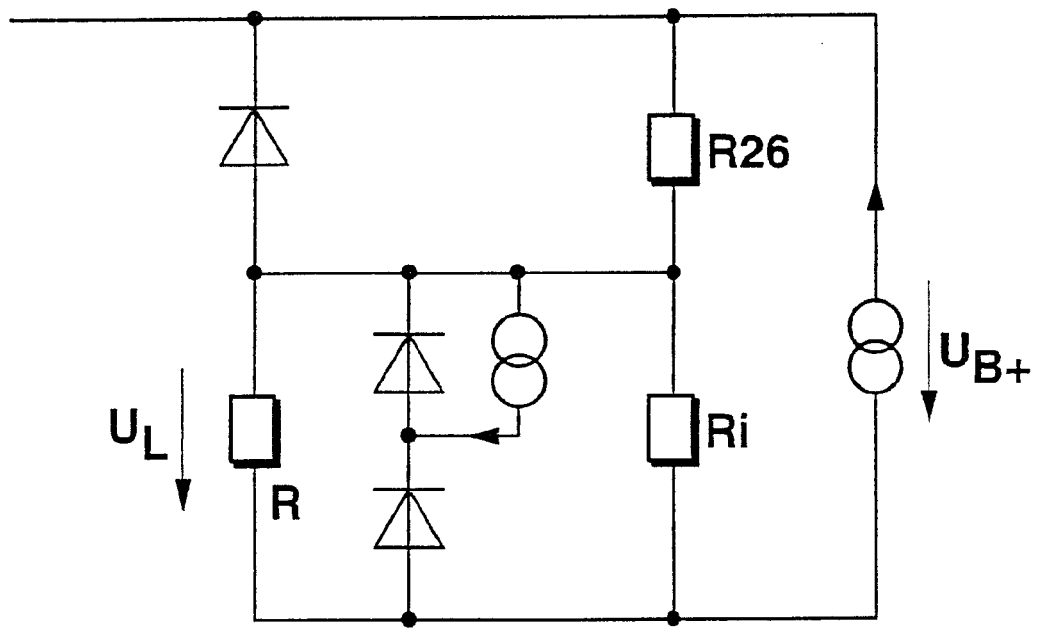

If the voltage at the terminal B+ and/or the terminal V exceeds a reference voltage threshold, set in the integrated circuit IS2, then the integrated circuit IS2 turns off the field effect transistor 31 and thus protects the regulator. The voltage at the terminal L is determined by the voltage UB+, the resistance of the charge monitoring light 26, the resistance of the relay 27, and the internal resistance Ri of the regulator 11. The determination of the voltage UL can be explained with the aid of the circuit shown in FIG. 2. In this circuit, the voltage UB+ is shown as the voltage source. The resistance of the light 26 is also shown as R26, and the internal resistance of the regulator is shown as Ri. The resistor RL is the load resistance.

If the internal resistance Ri of the regulator IS1 is 60 Ω and the internal resistance of a four-Watt charge monitoring light is 36 Ω and there is no relay resistor, the resultant voltage UL is 21 V, if the voltage UB+ is 34 V. This means that the regulator 11 can be used even in 28-V vehicle electrical systems, or given suitable adaptation of the internal resistance of the circuit IS1, in vehicle electrical systems of up to a voltage UB+ (maximum) of 80V. However, in that case care must be taken to prevent an overly great voltage drop across the light, because otherwise this could cause the destruction of the charge monitoring light.

The overvoltage evaluation circuit in the circuit IS2 is design such that partial-load shutoffs in the vehicle electrical system do not cause the charge monitoring light to light up. The terminal V- of the circuit IS2 is protected against high impedance.

3. Short circuit at terminal L to ground

A current limitation or current shutoff takes place in the circuit IS2. The charge monitoring light lights up if the ignition switch is turned on, and during operation no excitation is possible.

4. Short circuit from terminal L to terminal B+

Normal regulation takes place at a somewhat lower voltage. The charge monitoring light does not light up if the ignition switch is turned on.

5. Overvoltage pulse at terminal L by an inverse diode in the circuit IS2, the voltage is clamped to the voltage at B+; an overvoltage pulse therefore has no further negative effects.

6. Negative voltage pulse at terminal L

Clamping to ground is effected by an inverse diode of the circuit IS1.

7. Short circuit between terminal DF and ground

The overvoltage that occurs is detected, and the circuit IS2 switches off. A residual excitation takes place via the connection through the charge monitoring light 26; the charge monitoring light lights up. By means of a hysteresis circuit, an emergency regulating mode is possible by means of the circuit IS2. In currently conventional regulators, such an error can lead to an uncontrolled voltage increase and can damage the battery.

8. Short circuit between terminal DF and terminal L

The circuit IC1 is protected by a current limitation or current shutoff performed by circuit IS2. After the deexcitation, the voltage UV is less than the turn-off threshold in the circuit IS2. As a result the charge monitoring light lights up.

9. Short circuit from terminal DF to terminal B+

Such a short circuit leads to the destruction of the field end stage. An indication is given by way of a change in the internal resistance of the circuit IS1. By adding a short circuit-proof field end stage, such destruction can be avoided, in an expanded version of the embodiment shown in FIG. 1.

10. Short circuit from terminal B+ to ground.

In a short circuit between B+ and ground, the vehicle electrical system voltage breaks down. Damage to the regulator does not occur.

11. Short circuit from terminal V to ground

In this kind of short circuit, the circuit IC2 switches off. The current flow through the field effect transistor 31 is ended, and an error indication is given with the aid of the charge monitoring light 26.

12. Short circuit between terminal V and terminal B+

The regulator continues to function in accordance with the level of the voltage at the terminal V or B+.

13. Short circuit between terminal V and terminal L

The circuit IS2 is protected by a current limitation or a current shutoff that is performed in the circuit IS2 itself.

14. Short circuit between terminal V and terminal DF

Such a short circuit causes the destruction of the field end stage, that is, of the transistor 29. Such a destruction is indicated by a change in the internal resistance in the integrated circuit IC1.

15. Disconnection at the terminal B+

If the connection between the terminal B+ and the vehicle electrical system is disrupted, an indication is given by the charge monitoring light and a partial excitation of the generator occurs via the portion of the circuit that leads via the charge monitoring light 26.

16. Disconnection of a ground line

No regulator function is possible. An indication is possible, via the terminal V.

17. Disconnection at the terminal V

In the event of a disconnection at the terminal V, a display is given via the charge monitoring light 26 and a partial excitation takes place via the portion of the circuit that leads via the charge monitoring light.

18. Disconnection at terminal L at the generator

A display is effected by the charge monitoring light 26 on the basis of the internal resistance Ri of the integrated circuit IS1.

19. Disconnection externally at the terminal L.

No indication is given. The starting rpm of the generator increases as a consequence of the absence of preexcitation. Once the starting rpm is reached, normal generator regulation takes place.

20. Disconnection at the terminal DF.

No excitation of the generator is possible, because no current can flow through the exciter winding E. An indication is given via the internal resistance Ri of the integrated circuit; the charge monitoring light 26 responds on the basis of this internal resistance. In normal regulating operation, an electric arc is possible, and destruction of the regulator is not possible.

We claim:

1. A device for regulating the output voltage of a rotary current generator with stator windings and an exciter winding, with a voltage regulator which includes a control stage with a first integrated regulating circuit and a power stage with a regulating transistor, wherein the control stage influences the regulating transistor to influence the current through the exciter winding in such a way that the output voltage is kept at a predeterminable value, characterized in that the first integrated circuit (IS1) is connectable via a semiconductor switch to the terminal (B+) of the rotary current generator (10), and the semiconductor switch includes an integrated circuit (IS2), which triggers a smart power high-side switch (31).

2. The device of claim 1, characterized in that a rotary current generator without exciter diodes is used.

3. The device of claim 1, characterized in that the integrated circuit (IS1) has a monolith regulator (IC).

4. The device of claim 1, characterized in that the field effect transistor (31) is an MOS transistor wired as a switch.

5. The device of claim 1, characterized in that the integrated circuit IS1 and/or the integrated circuit IS2 is connected, for the sake of supplying information, to the terminals B+S, L, DF, D-, and V.

* * * * *